United States Patent
Sultan et al.

(10) Patent No.: US 8,549,178 B2
(45) Date of Patent: Oct. 1, 2013

(54) USING PROVIDER BACKBONE BRIDGED NETWORK TO REDUCE THE NUMBER OF MEDIA ACCESS CONTROL ADDRESSES VISIBLE TO CORE BRIDGES IN THE DATA CENTER

(75) Inventors: Robert Sultan, Somers, NY (US); T. Benjamin Mack-Crane, Downers Grove, IL (US)

(73) Assignee: Futurewei Technologies, Inc., Plano, TX (US)

( * ) Notice: Subject to any disclaimer, the term of this patent is extended or adjusted under 35 U.S.C. 154(b) by 720 days.

(21) Appl. No.: 12/786,651

(22) Filed: May 25, 2010

(65) Prior Publication Data

US 2010/0306415 A1    Dec. 2, 2010

Related U.S. Application Data

(60) Provisional application No. 61/182,571, filed on May 29, 2009.

(51) Int. Cl.
    *G06F 15/16* (2006.01)
(52) U.S. Cl.
    USPC ........................................................ 709/249
(58) Field of Classification Search
    USPC ........................................................ 709/249
    See application file for complete search history.

(56) References Cited

U.S. PATENT DOCUMENTS

| | | | |
|---|---|---|---|
| 8,385,215 B1 * | 2/2013 | Florit et al. ................... | 370/248 |
| 2007/0263640 A1 | 11/2007 | Finn | |
| 2008/0013547 A1 * | 1/2008 | Klessig et al. ........... | 370/395.53 |
| 2008/0170573 A1 * | 7/2008 | Ould-Brahim ................ | 370/392 |
| 2008/0267198 A1 * | 10/2008 | Sajassi ........................... | 370/401 |
| 2010/0274924 A1 * | 10/2010 | Allan et al. .................... | 709/245 |

FOREIGN PATENT DOCUMENTS

| | | |
|---|---|---|
| CN | 101043395 A | 9/2007 |
| CN | 101286922 A | 10/2008 |
| WO | 2008089305 A2 | 7/2008 |

OTHER PUBLICATIONS

IEEE P802.1ah/D3.4, Draft Amendment to IEEE Std 802.1Q, Mar. 10, 2007.*

Luyuan Fang, Nabil Bitar, Raymond Zhang, Michael Taylor "The Evolution of Carrier Ethernet Services—Requirements and Deployment Case Studies", IEEE Communications Magazine, Mar. 2008.*

IEEE Standard for Local and metropolitan area networks. Virtual Bridged Local Area Networks. Amendment 7: Provider Backbone Bridges, Aug. 14, 2008.*

(Continued)

*Primary Examiner* — Boris Gorney
(74) *Attorney, Agent, or Firm* — Conley Rose, P.C.; Grant Rodolph; Rayhao Chung (57) ABSTRACT

A system comprising a backbone core bridge (BCB) in a provider backbone bridged network (PBBN), and a backbone edge bridge (BEB) coupled to the BCB via a provider network port (PNP) and to a customer bridge in a customer bridged network via a C-tagged service interface, wherein the C-tagged service interface maps a service instance from the customer bridged network that is identified by a customer-virtual local area network identifier (C-VID) to a backbone service instance on the PBBN that is identified by a service instance identifier (I-SID).

15 Claims, 9 Drawing Sheets

(56) References Cited

OTHER PUBLICATIONS

Foreign Communication From a Related Counterpart Application—International Search Report and Written Opinion, PCT/CN2010/073369, Sep. 9, 2010, 11 pages.

Sultan, "PBBN in the Data Center," IEEE802.org, Jul. 2009.

Sultan, et al. "PBBN in the Data Center," IEEE 802.1 May 2009 Interim Meeting, Pittsburgh, PA, 17 pages.

"IEEE Standard for Local and Metropolitan Area Networks—Virtual Bridged Local Area Networks—Amendment 4: Provider Bridges," IEEE Computer Society, IEEE Std. 802.1ad™—2005, May 26, 2006.

"IEEE Standard for Local and Metropolitan Area Networks—Virtual Bridged Local Area Networks—Amendment 7: Provider Backbone Bridges," IEEE Computer Society, IEEE Std. 802.1ah™—2008, Aug. 14, 2008.

"IEEE Draft Standard for Local and Metropolitan Area Networks—Virtual Bridged Local Area Networks—Amendment: Customer Backbone Bridging," LAN/MAN Standards Committee of the IEEE Computer Society, IEEE P802.1Qbx/ D0.0, Apr. 23, 2010.

U.S. Appl. No. 61/158,268, Titled "Reducing the Number of Media Access Control Addresses Visible to Bridges in the Data Center," filed Mar. 6, 2009, 24 pages.

* cited by examiner

USING PROVIDER BACKBONE BRIDGED NETWORK TO REDUCE THE NUMBER OF MEDIA ACCESS CONTROL ADDRESSES VISIBLE TO CORE BRIDGES IN THE DATA CENTER

CROSS-REFERENCE TO RELATED APPLICATIONS

The present application claims priority to U.S. Provisional Patent Application No. 61/182,571 filed May 29, 2009 by Robert Sultan, et al. and entitled "Method of Using Provider Backbone Bridged Network to Reduce the Number of Media Access Control Addresses Visible to Core Bridges in the Data Center," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications and data networks, such as Ethernet based networks, are comprised of nodes that transport data through the network. The nodes may include routers, switches, and/or bridges that transport the individual data frames or packets through the network. Some nodes can forward the data frames based on their learned or provisioned filtering databases (FDBs). As such, the nodes forward data frames based on associated destination addresses (DAs) in the FDBs. If a node's FDB does not comprise an entry that matches an incoming frame's DA, the frame could be flooded on all the ports of the node except the one on which the frame was received.

In some data networks, e.g. in data centers, a bridge is used to couple a plurality of servers. As such, a server may communicate with other servers via a plurality of interconnected bridges to which the servers are attached. However, in current data centers, the quantity of servers continues to increase and may cause the capacity of the FDB in one or more bridges to be exceeded. As such, a bridge may not be capable of learning the DAs, e.g. the Media Access Control (MAC) addresses, that correspond to every server in the network and consequently may flood the data frames that comprise unknown DA's that are not found in the FDB. Such flooding can increase the amount of transported traffic in the data center and thus degrade the network performance.

SUMMARY

In one embodiment, the disclosure includes a system comprising a backbone core bridge (BCB) in a provider backbone bridged network (PBBN), and a backbone edge bridge (BEB) coupled to the BCB via a provider network port (PNP) and to a customer bridge in a customer bridged network via a C-tagged service interface, wherein the C-tagged service interface maps a service instance from the customer bridged network (CBN) that is identified by a customer-virtual local area network identifier (C-VID) to a backbone service instance on the PBBN that is identified by a service instance identifier (I-SID).

In another embodiment, the disclosure includes a network comprising a PBBN that comprises a plurality of core bridges, and a plurality of customer bridges (CBs) coupled to the PBBN, wherein at least some of the core bridges do not support Institute of Electrical and Electronics Engineers (IEEE) 802.1ad for provider bridging but do support IEEE 802.1Q for virtual local area network (VLAN) bridging.

In yet another embodiment, the disclosure includes a network component comprising at least one processor coupled to a memory and configured to transfer a plurality of bridge protocol data units (BPDUs) between a core bridge in a PBBN and a customer bridge in a data center network (DCN) coupled to the PBBN, and transfer a plurality of multiple registration protocol (MRP) protocol data units (PDUs) between the core bridge and the customer bridge, wherein the customer bridge's media access control (MAC) address in the DCN is not visible to the core bridge in the PBBN.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for reducing the quantity of MAC addresses that may be visible to a plurality of bridges in a DCN using a PBBN configuration. The PBBN may be used in the DCN to inter-couple a plurality of servers. The servers may be coupled via a plurality of CBs to a plurality of bridges in the PBBN. The PBBN may comprise a plurality of BCBs at the core of the DCN and a plurality of BEBs that may be coupled to the CBs at the edge of the PBBN. The BCBs may be configured to forward data frames by learning the MAC addresses of the components at the core of the DCN (e.g. the PBBN) without learning the MAC addresses at the edge of the DCN (e.g. the server MAC addresses). Thus, the BCBs may learn subsets of the MAC addresses but not all the MAC addresses in the DCN and may not exceed the capacities of their FDBs. Doing so may avoid extra flooding and hence performance deterioration. The BEBs may also be configured to communicate C-tagged data frames with the BCBs. As such, the PBBN may support a plurality of C-VLANs that may be extended across the DCN. Additionally, the BEBs may allow BPDUs and/or MRP PDUs between a CBN and the PBBN, handle Encapsulated Address Types (EATs) instead of I-SIDs in the data frames, process a group Customer-Destination MAC (C-DMAC) address in order to multicast data frames in the PBBN, or combinations thereof.

Figure 1:
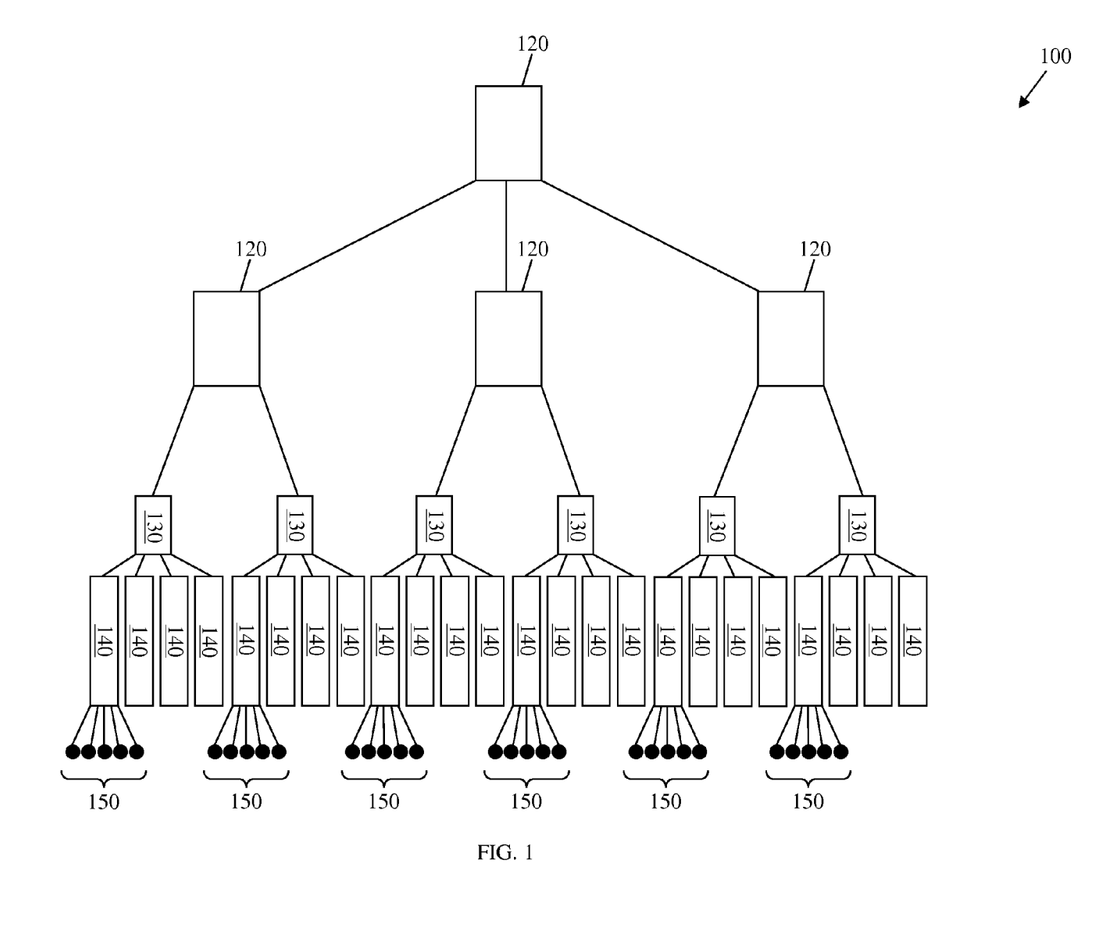
FIG. 1 is a schematic diagram of an embodiment of a DCN.

FIG. 1 illustrates an embodiment of a DCN 100 that comprises a PBBN, e.g. in a data center. The DCN 100 may comprise a plurality of BCBs 120, a plurality of BEBs 130 coupled to the BCBs 120, a plurality of CBs 140 coupled to the BEBs 130, and a plurality of servers 150 coupled to the CBs 140. The BCBs 120 and the BEBs 130 may correspond to the PBBN in the DCN 100. Further, the CBs 140 and the servers 150 may correspond to a CBN in the DCN 100. The different components of the DCN 100 may be coupled to each other in a hierarchy as shown in FIG. 1. For instance, each BEB 130 may be coupled to different subsets of servers 150 via different CBs 140. FIG. 1 shows some of the CBs 140 that are coupled to the servers 150; however, the DCN 100 may comprise any number of CBs 140 that may be coupled to any number of servers 150.

In an embodiment, the BCBs 120 may be any devices or components configured to transfer data, e.g. data frames, between the different BEBs 130. The BCBs 120 may also be arranged in a hierarchy, e.g. as shown in FIG. 1, and thus may transfer data frames between other BCBs 120 at lower levels in the hierarchy. The BCBs 120 may be configured based on IEEE standard 802.1ah for Provider Backbone Bridging (PBB), which specifies that BCBs conform to standard 802.1ad Service-VLAN (S-VLAN) Bridges and is incorporated herein by reference as if reproduced in its entirety. The BCBs 120 may forward data frames between two of the BEBs 130 or two other BCBs 120 by learning, e.g. using local FDBs, the MAC addresses that correspond to the BEBs 130 and/or the BCBs 120. For example, a BCB 120 may receive on a first port from a first BEB 130 a data frame that comprises a DA that indicates a MAC address of a second BEB 130. Hence, the BCB 120 may send the data frame to the second BEB 130 if the second BEB 120 is coupled to the BCB 130 or to a higher level BCB 120 on a second port that is associated with the DA in an entry in the FDB. However, the BCBs 120 may not be aware of the MAC addresses that correspond to the servers 150 at the edge of the DCN 100 or that are known to the CBs 140 in the CBN.

In an embodiment, the BEBs 130 may be any devices or components configured to transfer data, e.g. data frames, between the CBs 140 and the BCBs 120 or between the different CBs 140. The BEBs 130 may forward data frames between two CBs 140 or between one of the CBs 140 and one of the BCBs 120 by learning, e.g. using local FDBs, the MAC addresses that correspond to the servers 150. For example, a BEB 130 may receive on a first port from a first CB 140 a data frame that comprises a DA that indicates a MAC address of a server 150. Hence, the BEB 130 may send the data frame to a second CB 140 if the second CB 140 is coupled to the BEB 130 or to a BCB 120 on a second port that is associated with the DA in an entry in the FDB.

In an embodiment, the CBs 140 may be any devices or components configured to process, store, and/or communicate data, e.g. data frames, between the different servers 150, between the servers 150 and the BEBs 130, or both. The CBs 140 may forward data frames between two servers 150 or between one of the servers 150 and one of the BEBs 130 by learning the MAC addresses that correspond to the servers 150. For example, a CB 140 may receive on a first port from a first server 150 a data frame that comprises a DA that indicates a MAC address of a second server 150. Hence, the CB 140 may send the data frame to the second server 150 if the second server 150 is coupled to the CB 140 or to a BEB 130 on a second port that is associated with the DA in an entry in the FDB. However, the CB 140 may not be aware of the MAC addresses that correspond to the BCBs 120 at the core of the DCN 100.

The servers 150 may exchange data frames, e.g. via the component of the DCN 100, by using their MAC addresses as DAs and/or source addresses (SAs) in the data frames. Additionally, the servers 150 may be connected via a plurality of VLANs in the DCN 100, and may use a plurality of VLAN Identifiers (VIDs) in the data frames that indicate their corresponding VLANs. The DAs and the VIDs may be learned in the local FDBs of the components of the DCN 100 so that the components of the DCN 100 may properly forward the data frames. Typically, the servers 150 may not be aware of the MAC addresses that correspond to the BCBs 120 at the core of the DCN 100.

In the PBBN configuration described above, the MAC addresses of the BEBs 130 may be visible to the components at the core of the DCN 100, e.g. the BCBs 120, and may not be learned or used by the components at the edge of the DCN 100, e.g. the CBs 140 and the servers 150. Similarly, the MAC addresses of the servers 150 may be visible to the components at the edge of the DCN 100, but not to the components at the core of the DCN 100. A BEB 130 may learn the MAC addresses of the servers 150 that may be coupled via CBs 140 to the BEB 130. As such, the quantity of MAC addresses that may be learned and maintained by the different components of the DCN 100 may not exceed the capacities of their corresponding FDBs. Consequently, the data frames may be properly forwarded in the DCN 100 without substantial flooding, e.g. due to unlearned MAC addresses, and hence without substantial deterioration in network performance. For example, a typical bridge may support from about 16,000 to about 32,000 MAC addresses in the FDB. Other improved bridges may support about 64,000 MAC addresses. Such capacity may be sufficient to maintain the quantity of MAC addresses (e.g. MAC addresses associated with BEBs 130) in the core of the DCN 100 but may not be sufficient to maintain the MAC addresses associated with all the servers 150 at the edge of the DCN 100. Thus, the use of PBBN may improve network performance by reducing the visible MAC addresses and hence avoiding unnecessary flooding, which may substitute for a higher cost solution, such as increasing the FDB capacities in the bridges or replacing the bridges with higher capacity bridges.

Typically, a PBBN may be used in a Service Provider Network (SPN), where the PBBN components (e.g. the BCBs and BEBs) may be configured based on IEEE 802.1ad and 802.1ah for Provider Bridging, both of which are incorporated herein by reference as if reproduced in its entirety. In such a scenario, the PBBN edge (e.g. the BEBs) may be coupled to a plurality of Provider Bridges (PBs) and may communicate with the PBs according to IEEE 802.1ad. However, the DCN 100 may be different from the SPN in that at least some of the components or bridges of the DCN 100 may support IEEE standard 802.1Q but may not necessarily support IEEE 802.1ad amendments to IEEE 802.1Q. For instance, the BCBs 120 may comprise DCBs, which may be C-VLAN Bridges (e.g. that conform to IEEE 802.1Q) instead of S-VLAN Bridges (e.g. that conform to IEEE 802.1ad). Furthermore, the BEBs 130 may be configured to transport Service-tagged (S-tagged) data frames over a plurality of S-VLANs, e.g. according to IEEE 802ad. As such, to ensure efficient data transport and interconnections between the bridges of the DCN 100, the BEBs 130 may need to handle the exchange of both C-VLAN traffic and S-VLAN traffic with the BCBs 120. For instance, the BEBs 130 may be configured to handle the C-tagged data frames that may be exchanged with BCBs 120 in a manner similar to the S-tagged data frames, as described in detail below.

For instance, a BEB 130 may communicate with a BCB 120 via a port which may be configured to exchange the C-tagged traffic with the BCB 120, e.g. if the BCB 120 does not support IEEE 802.1ad. The BEB 130 may use in the data frames a C-tagged service type that is substantially similar to a S-tagged service type. However, the C-tagged service type may be used on frames that have an uppermost tag value equal to about ×8100, which may identify a Customer-tag (C-tag) value. In the case where the BCB 120 is configured based on IEEE 802.1ad, the PNP may be used to exchange S-tagged traffic between the BEB 130 and the BCB 120. Further configurations to the PBBN and the PBBN components, e.g. the BEB, to support the DCN environment are described below.

Figure 2:
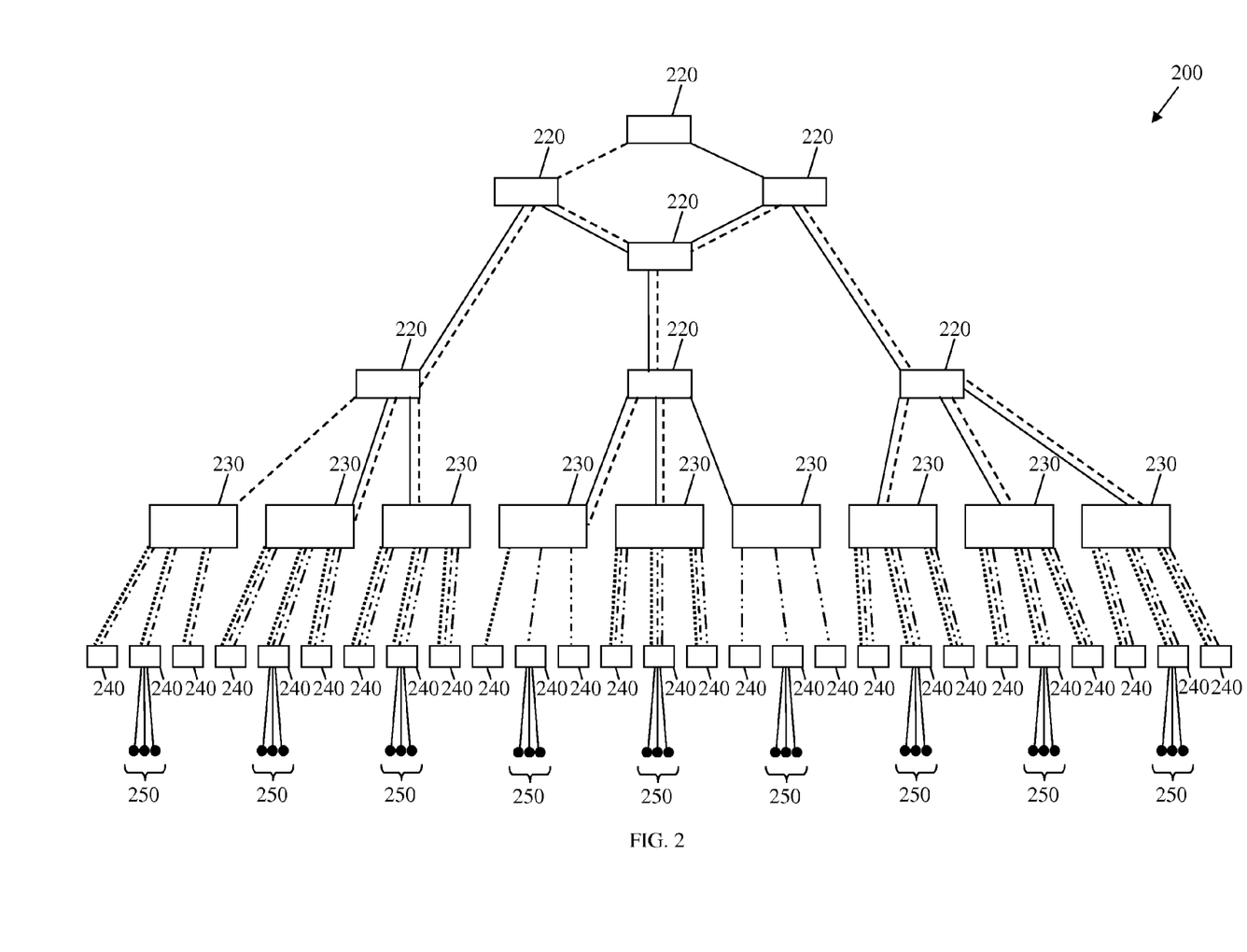
FIG. 2 is a schematic diagram of another embodiment of a DCN.

FIG. 2 illustrates an embodiment of another DCN 200 that comprises a plurality of VLANs. The DCN 200 may comprise a plurality of BCBs 220, a plurality of BEBs 230 coupled to the BCBs 220, and a plurality of CBs 240 coupled to the BEBs 230. Additionally, the CBs 240 may be coupled to a plurality of servers 250. FIG. 2 shows some of the CBs 240 that are coupled to the servers 250; however, the DCN 200 may comprise any number of CBs 240 that may be coupled to any number of servers 250. The components of the DCN 200, e.g. the bridges and nodes, may be configured substantially similar to the corresponding components of the DCN 100.

Additionally, the components of the DCN 200 may be coupled to each other via a plurality VLANs. In FIG. 2, the different VLANs are represented using different line styles. Specifically, the components at the core of the DCN 200, e.g. the BCBs 220 and the BEBs 230, may be coupled via a plurality of established Backbone-VLANs (B-VLANs). For instance, the BCBs 220 and the BEBs 230 may exchange Backbone-tagged (B-tagged) data frames across the B-VLANs. The components may use different B-VLAN identifiers (B-VIDs) in the data frames to indicate the corresponding B-VLANs that are used to communicate or transport the traffic at the core of the DCN 200. Further, the components at the edge of the DCN 200, e.g. the BEBs 230, the CBs 240, and optionally the servers 250 may be coupled via a plurality of established VLANs, which may be different than the B-VLANs.

Typically in a SPN scenario, the BEBs at the PBBN edge may be coupled to a plurality of PBs via a plurality of S-VLANs and as such may exchange S-tagged data frames with the PBs. The SPN components may use different Service-VIDs (S-VIDs) in the data frames to indicate the corresponding S-VLANs that are used to transport the SPN traffic. In a typical SPN scenario, the BEBs may map the S-VLANs to the B-VLANs at the core of the PBBN, e.g. by mapping the S-VIDs in the S-tagged traffic to the B-VIDs in the B-tagged traffic. However, the BEBs in the SPN may not be capable of mapping C-tagged traffic in a C-VLAN to B-tagged traffic in a corresponding B-VLAN. In an embodiment, if the BCBs 220 in a data center environment at the core of the DCN 200 may exchange C-tagged traffic with the BEBs 230, the BEBs 230 may be enabled to map each C-VLAN to a corresponding B-VLAN. For instance, a mapping function may be added to the BEBs 230 to map the C-tagged traffic of the C-VLAN to the corresponding B-VLAN in a manner similar to mapping S-tagged traffic of a S-VLAN to a corresponding B-VLAN.

For example, the BEBs 230 may use port mapping to map the different VLANs. The BEBs 230 may map the ports that correspond to a B-VLAN at the core of the DCN 200 to the ports that correspond to the VLANs at the edge of the DCN 200. However, such port mapping may not allow the distribution of traffic from the different VLANs at the edge of the DCN 200 over multiple B-VLANs at the core of the DCN 200, since each port may be assigned to a single B-VLAN. In an embodiment, the BEBs 230 may be configured instead to handle C-tagged traffic in a manner similar to S-tagged traffic, e.g. by configuring the ports of the BEBs 230 as described above. The BEBs 230 may be coupled to the CBs 240 via a plurality of C-VLANs, and thus may exchange C-tagged data frames with the CBs 240. Accordingly, the BEBs 230 may map the C-VLANs to the B-VLANs in a manner similar to mapping the S-VLANs to the B-VLANs. For instance, the BEBs 230 and CBs 240 may use different C-VIDs in the data frames to indicate the corresponding C-VLANs and may map the C-VLANs to the B-VLANs at the core of the DCN 200 by mapping the C-VIDs in the C-tagged traffic to the B-VIDs in the B-tagged traffic.

Figure 3:
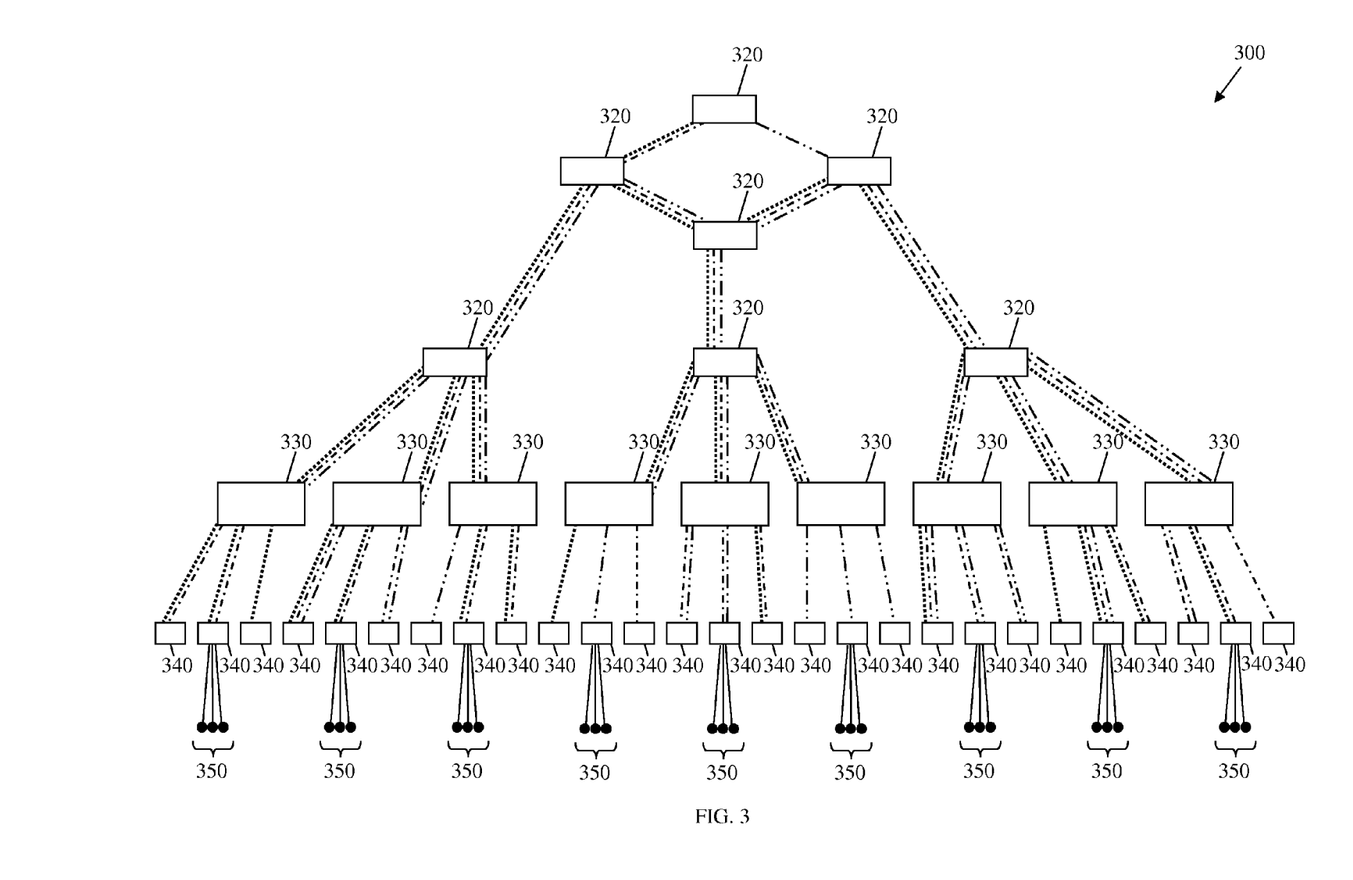
FIG. 3 is a schematic diagram of another embodiment of a DCN.

FIG. 3 illustrates an embodiment of another DCN 300 that comprises a plurality of VLANs. The DCN 300 may comprise a plurality of BCBs 320, a plurality of BEBs 330, a plurality of CBs 340, and a plurality of servers 350, which may be substantially configured similar to the corresponding components of the DCN 200. The components of the DCN 300 may also be connected to each other via a plurality VLANs. However, unlike the DCN 200, the DCN 300 may comprise a plurality of VLANs that extend across the entire network, e.g. between the core and edge of the DCN 300. As such, a network administrator of the DCN 300 may not need to configure or change any established VLANs at the edge of the DCN 300, e.g. at the CBs 340 and the BEBs 330, according to the PBBN configuration at the core of the DCN 300. For instance, a plurality of C-VLANs may be established between the CBs 340 and the BEBs 330. Such C-VLANs may be extended to the core of the DCN 300, e.g. to the BCBs 320 instead of mapping the C-VLANs to a plurality of B-VLANs at the core. In FIG. 3, the different C-VLANs are represented by different line styles that extend between the core and edge of the DCN 300.

In an embodiment, the C-VLANs may be extended across the PBBN or the DCN 300 using a Spanning Tree Protocol (STP). As such, the BEBs 330 may be configured to allow the transfer of BPDUs between the core and the edge of the DCN 300, e.g. between the BCBs 320 and the CBs 340. Additionally, the BEBs 330 may allow the transfer of MRP PDUs between the core and the edge of the DCN 300 to support the registration of VLANs and MAC addresses across the DCN 300. Typically, to map the different VLANs between the core and the edge of a PBBN, such as in a SPN, a plurality of I-SIDs may be used in the data frames to map the B-VIDs at the core of the network to the VIDs at the edge of the network, e.g. based on IEEE 802.1ad. Each of the B-VIDs and corresponding S-VIDs may be mapped to the I-SIDs in a mapping table, e.g. in a BEB 330. However, since the C-VLANs may be extended across the DCN 300, the C-VIDs that are used to identify the different C-VLANs may be identical to the I-SIDs and/or the B-VIDs in the data frames. Therefore, the I-SIDs may not be needed and may be removed from the data frames, which may be transferred between the core and the edge of the DCN 300.

In an embodiment, the I-SID may be removed from a data frames by removing a Backbone Service Instance-tag (I-tag) that comprises the I-SID from the data frame and adding an Encapsulated Address Type (EAT) tag (that is specified within the IEEE 802.1ah standard), which may be typically restricted to internal interfaces. Allowing the use of the EAT instead of the I-SID in the data frame may save about four bytes in each transmitted data frame, which may reduce network traffic. The I-SID may also be removed from the mapping tables, e.g. at the BEBs 330, since the I-SIDs may be identical to the C-VIDs and/or the B-VIDs. Removing the I-SIDs from the mapping table may reduce the amount of storage in the DCN 300.

In an embodiment, a group MAC address that indicates a plurality of MAC addresses may be used to multicast traffic across the different C-VLANs that extend the DCN 300. Typically, a Backbone Service Instance Group Address (BSIGA) or a group Backbone-Destination MAC (B-DMAC) that reflects the number of MAC addresses in the core of a PBBN, e.g. in a SPN environment, may be used to multicast traffic across the SPN. The BSIGA or group B-DMAC may be mapped to a plurality of DAs, e.g. at the BEBs, to properly forward the traffic at the edge of the SPN. However, since the C-VLANs may extend across the DCN 300, it may be advantageous to configure the components of the PBBN to multicast traffic using a group C-DMAC, which may reduce the number of B-DMAC group addresses that need to be provisioned. Using a group C-DMAC that indicates a plurality of Customer-DAs (C-DAs) instead of using and mapping the BSIGA or group B-DMAC to the C-DAs may improve network performance, since the number of MAC addresses at the core (e.g. backbone side) may be substantially smaller than the number of MAC addresses at the edge (e.g. customer side). For example, the group C-DMAC may be used in the multicast data frames at the edge of the DCN 300 and an identical B-DMAC may be used at the core of the DCN 300.

Figure 4:
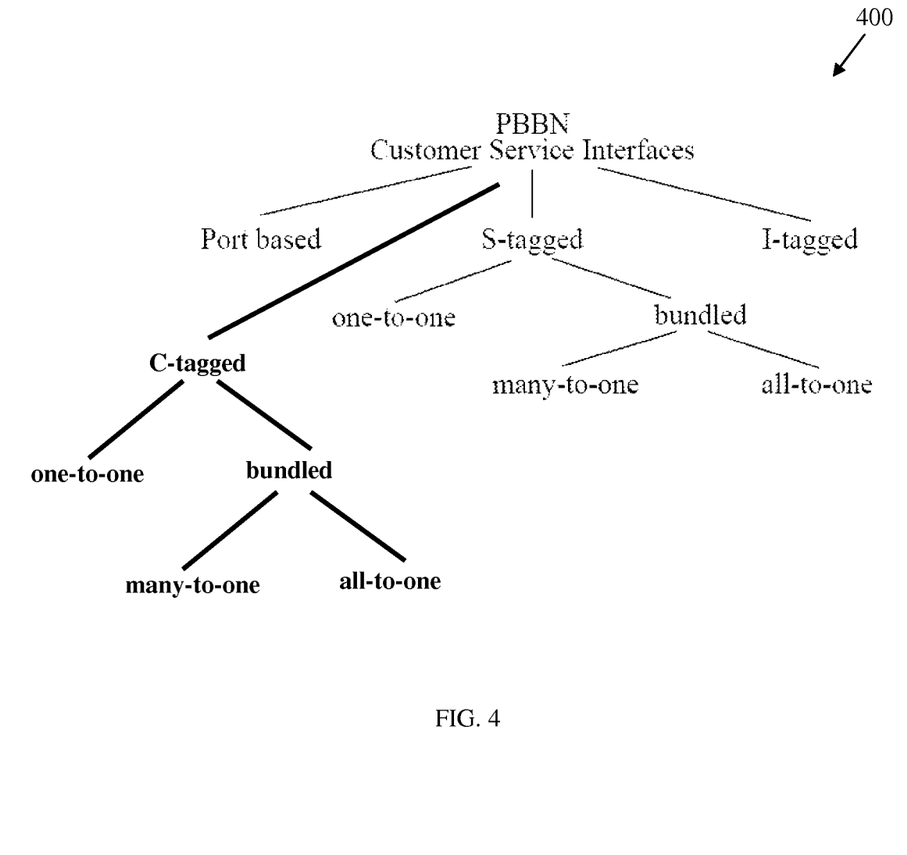
FIG. 4 is a schematic diagram of an embodiment of a customer service interface.

FIG. 4 illustrates one of a plurality of customer service interfaces 400, which may be provided to customers using a PBBN, e.g. based on IEEE 802.1ah. A backbone provider may offer a plurality of customers (e.g. customer nodes) one or more types of service interfaces, which may each have different capabilities for service selection, priority selection, and service access protection. In some cases, the customers may provide a C-VLAN aware component of a PB or a S-VLAN aware component of a PB. In other cases, generic customer systems may also be allowed. As shown in FIG. 4, there may be five basic types of customer service interfaces: Port-based, S-tagged, C-tagged, I-tagged, and transparent.

Figure 5:
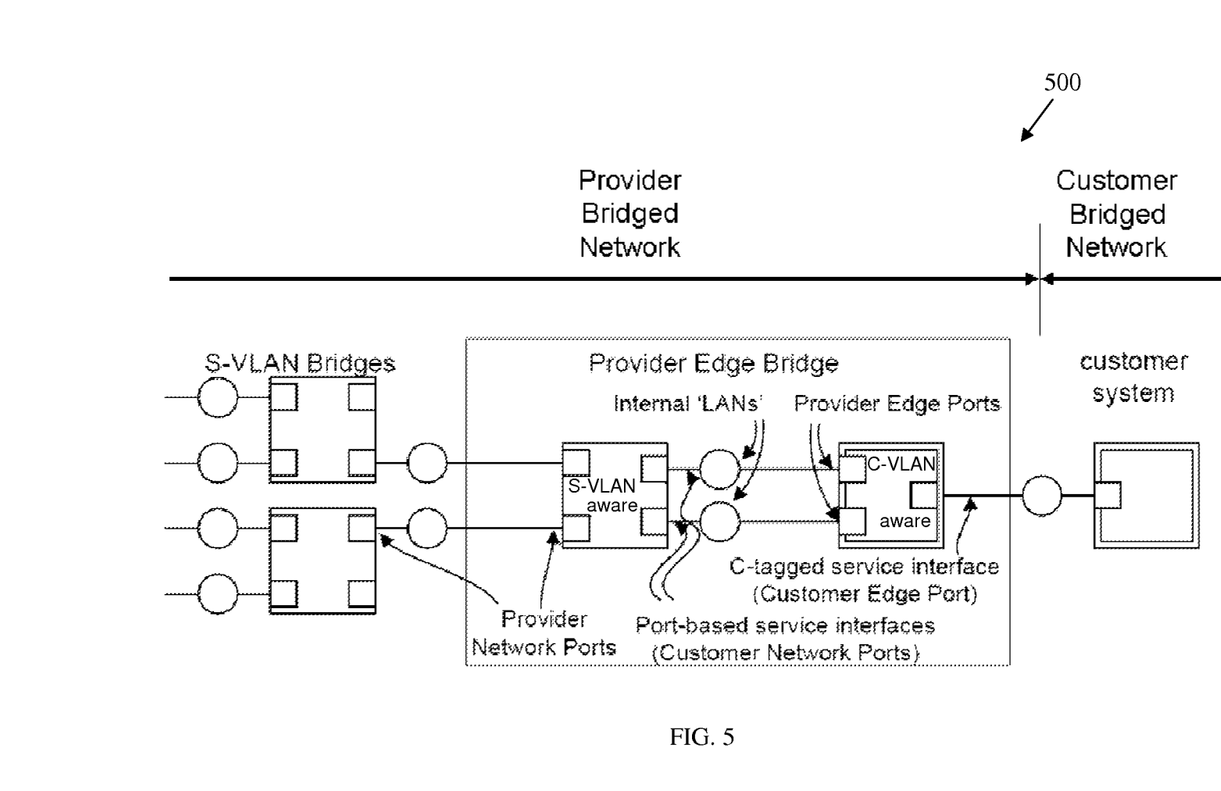
FIG. 5 is a schematic diagram of an embodiment of a C-tagged service interface.

FIG. 5 illustrates a C-tagged service interface in a Provider Edge Bridge (PEB) 500, e.g. in a provider bridged network (PBN). The C-tagged service interface may map a service instance from a CBN, which may be identified by a C-VID, to a backbone service instance on a PBBN, which may be identified by an I-SID. There may be two types of C-tagged service interfaces: a first type that performs a one-to-one mapping of C-VIDs to I-SIDs and a second type that bundles C-VIDs to I-SIDs. The frames that are mapped to the I-SID may be carried over the PBBN, but the frames that are not mapped to an I-SID may not be carried over the PBBN.

Additionally, each CBN C-VLAN may be restricted to map to a single backbone service instance on the PBBN, which may allow PBBN equipment that receives frames to correctly identify the service instance used to deliver that frame. Such restriction may also prevent configuring the I-component to create a multipoint service from point-to-point service instances, which may result in accidental creation of data loops. The backbone provider may offer a multipoint service through appropriate configuration of the B-VLAN component. Further, a PBBN may provide a C-tagged service interface for attachment to CBNs. A C-tagged service interface may be provided by a BEB over a Customer Edge Port (CEP).

The C-tagged service interface may have any of the variations shown in FIG. 4 under the C-tagged branch. The first variation, which may be referred to as a one-to-one C-tagged interface, may use a one-to-one mapping between C-VIDs and I-SIDs. This interface variation may map each C-VID to a single I-SID for use over the PBBN. The one-to-one mapped interface may not carry the C-tag over the PBBN. The Canonical Format Indicator (CFI) and Priority Code Point (PCP) bits may be regenerated on ingress and then carried in the Service Instance Drop Eligibility Indicator (I-DEI) and Service Instance-PCP (I-PCP) bits in the I-tag across the PBBN. On the egress of the one-to-one C-tagged interface, the C-tag may be deduced from the I-tag received from the PBBN. For example, the I-SID may be mapped to a C-VID, and the I-DEI and I-PCP bits may be regenerated and then carried in the CFI and PCP bits.

The second C-tagged service interface variation may be the bundling of C-tagged service interface. This interface variation may map multiple C-VIDs to a single I-SID for delivery over the PBBN, e.g. to allow the remote end to reconstruct the C-VID. This interface variation may carry a C-tag over the PBBN. On a bundled C-tagged interface, the CFI and PCP bits of the C-tag may be regenerated and are carried in both the CFI and PCP bits of the C-tag and the I-DEI and I-PCP bits of the I-tag over the PBBN. A special case of the bundling C-tagged service interface is where all C-VIDs may be mapped to a single I-SID. This special case may be referred to as an all-to-one bundled C-tagged service interface. The I-component used for the all-to-one bundled C-tagged service interface may be constrained to supporting a single C-tagged service interface.

Figure 6:
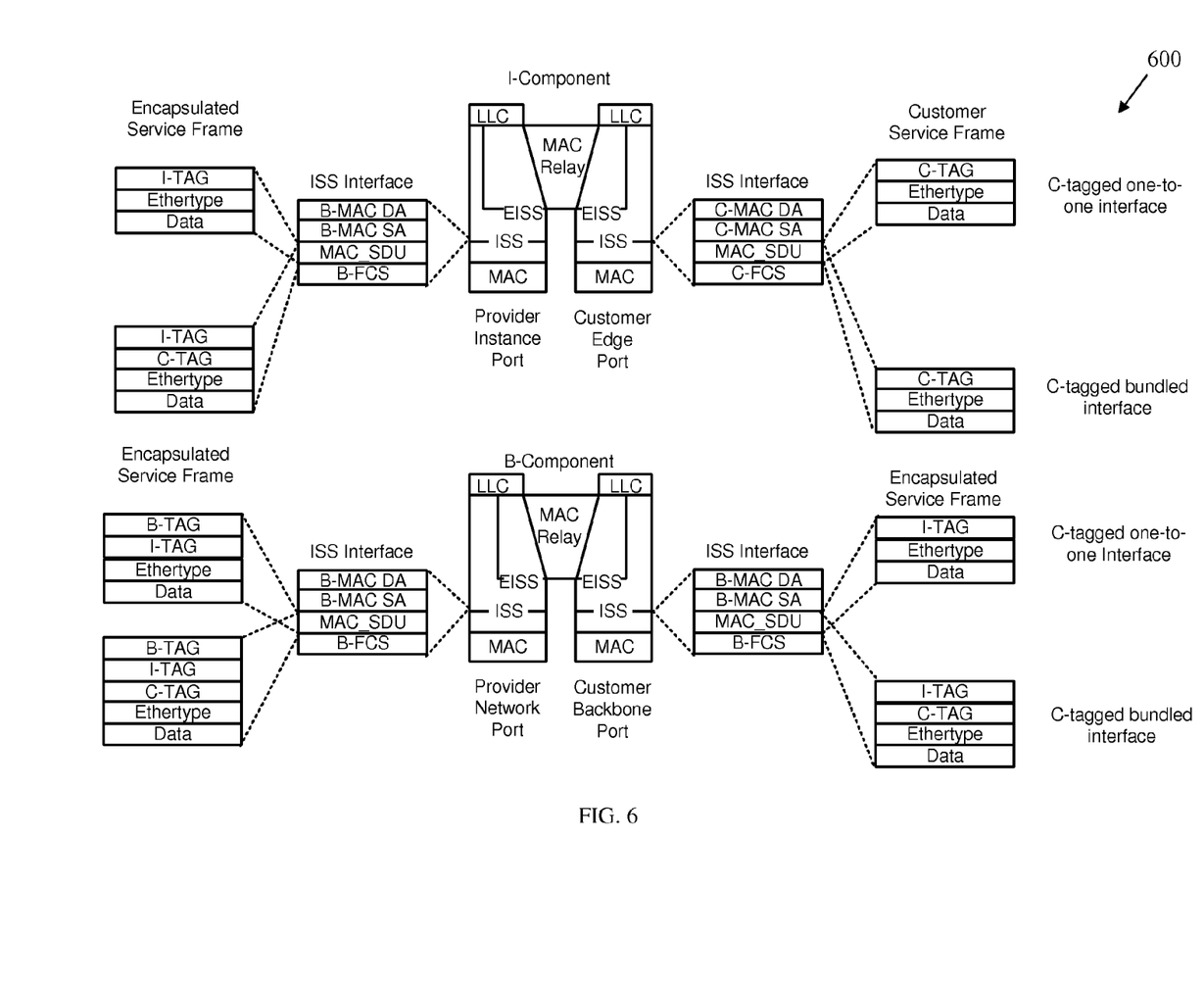
FIG. 6 is a schematic diagram of an embodiment of a Customer Bridged Network (CBN) coupled to a PBBN.
Figure 7:
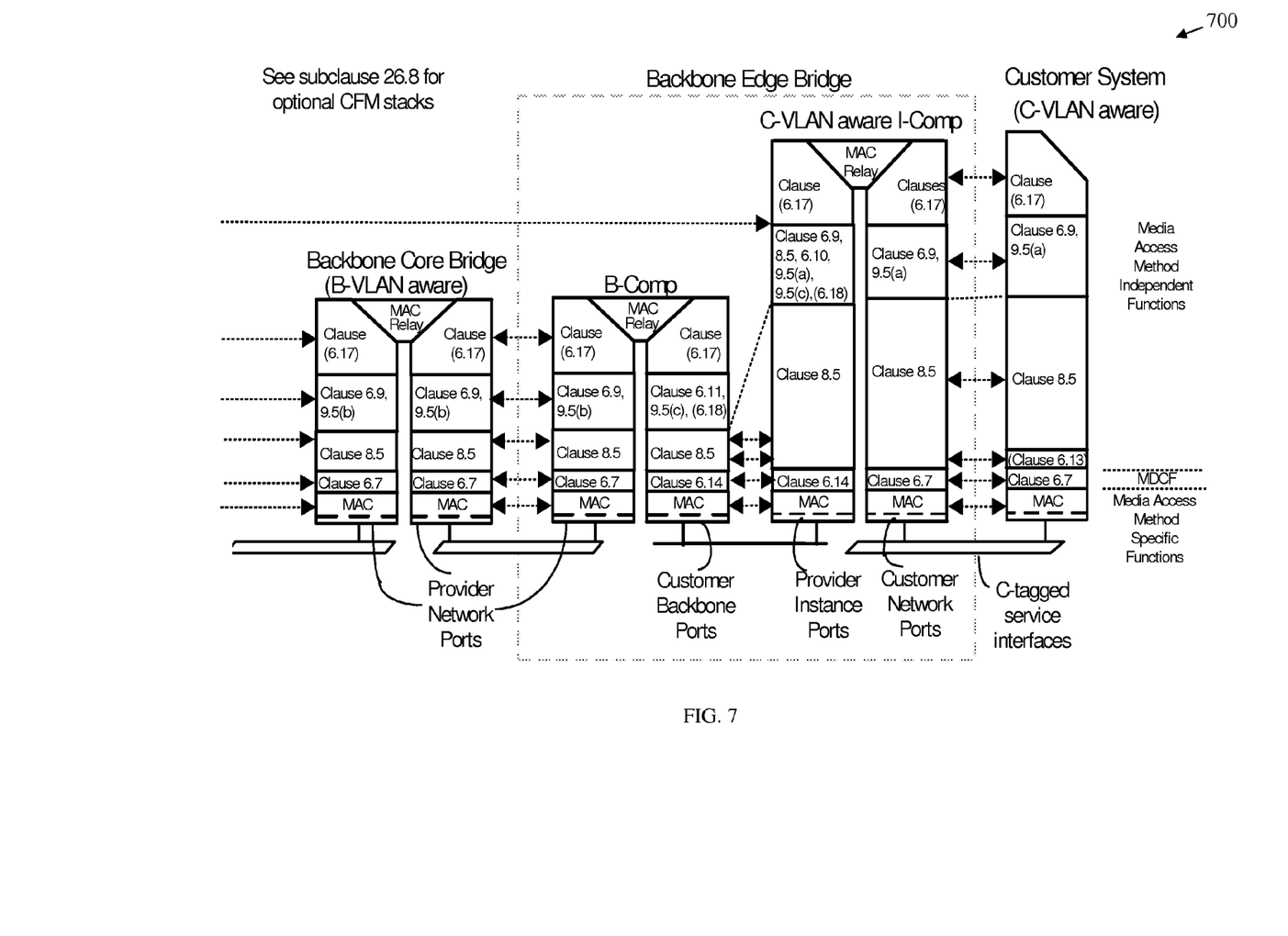
FIG. 7 is a schematic diagram of another embodiment of a C-tagged service interface.

FIG. 6 illustrates a CBN 600 that may be coupled to a PBBN using a C-tagged service interface. The CBN may use a plurality of CBs with C-VLAN aware components for connecting to the PBBN. The PBBN in turn may comprise a plurality of BEBs that may interface to the Customer and BCBs, which may be used to forward frames between the BEBs. FIG. 7 shows the C-tagged service interface 700 that may be used to couple the CBN to the PBBN.

Figure 8:
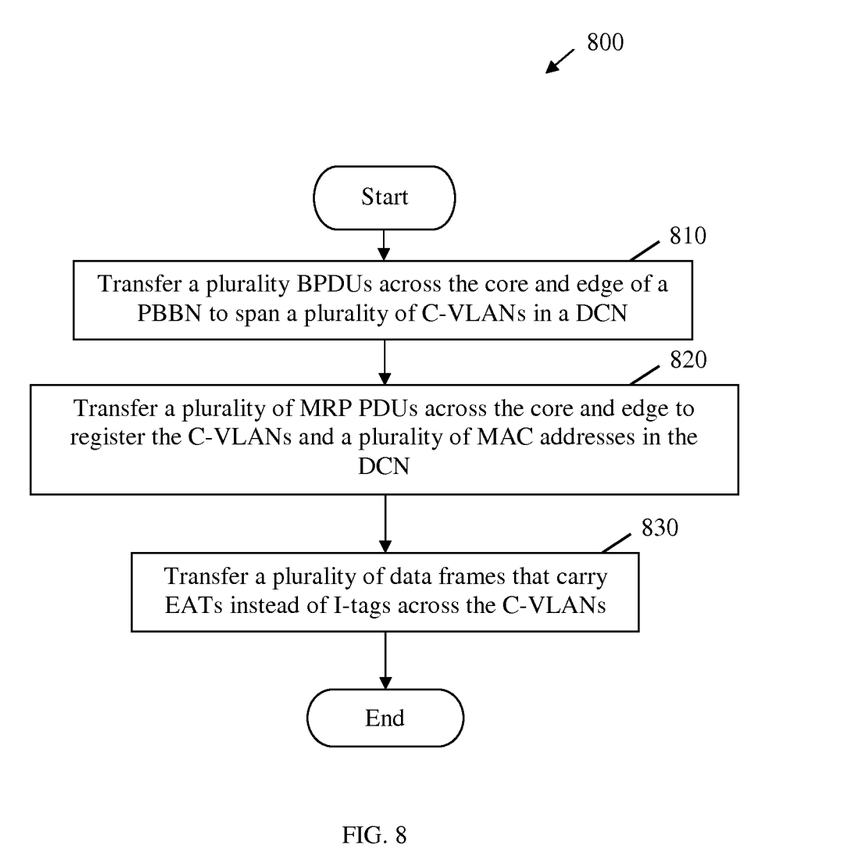
FIG. 8 is a flowchart of an embodiment of a Customer Virtual Local Area Network (C-VLAN) configuration method.

FIG. 8 illustrates an embodiment of a C-VLAN configuration method 800, which may be used at a PBBN edge or BEB, e.g. a BEB 330, in a DCN environment. Specifically, the C-VLAN configuration method 800 may be used to establish a plurality of C-VLANs that may be extended across the core and edge portions of the DCN, such as in the DCN 300. The C-VLANs may extend between the backbone side and the customer side of the DCN and may be used to transfer unicast frames and/or multicast frames between the components of the DCN. The C-VLAN configuration method 800 may be supported by configuring the PBBN and/or the BEB in a DCN environment as described above.

The method 800 may begin at block 810, where a plurality of BPDUs may be transferred across the core and edge of a PBBN to span a plurality of C-VLANs in a DCN. For example, the BEBs 330 may transfer the BPDUs between the BCBs 320 and the CBs 340 to implement a STP, and hence establish C-VLANs that extend the core and edge of the DCN 300. At block 820, a plurality of MRP PDUs may be transferred across the core and edge of a PBBN to register the C-VLANs and a plurality of MAC addresses in the DCN. For example, the BEBs 330 may transfer the MRP PDUs between the BCBs 320 and the CBs 340 to register the C-VIDs of the C-VLANs and the MAC addresses of the bridges at the local FDBs of the DCN components. At block 830, a plurality of data frames that carry EAT tags instead of I-tags may be transferred across the C-VLANs. For example, the BEBs 330 may transfer the data frames between the backbone side and customer side of the DCN based on the C-VIDs and EATs in the data frames. However, the data frames may not comprise I-SIDs, since the C-VIDs may also represent the I-SIDs for the different traffic. The method 800 may then end.

Figure 9:
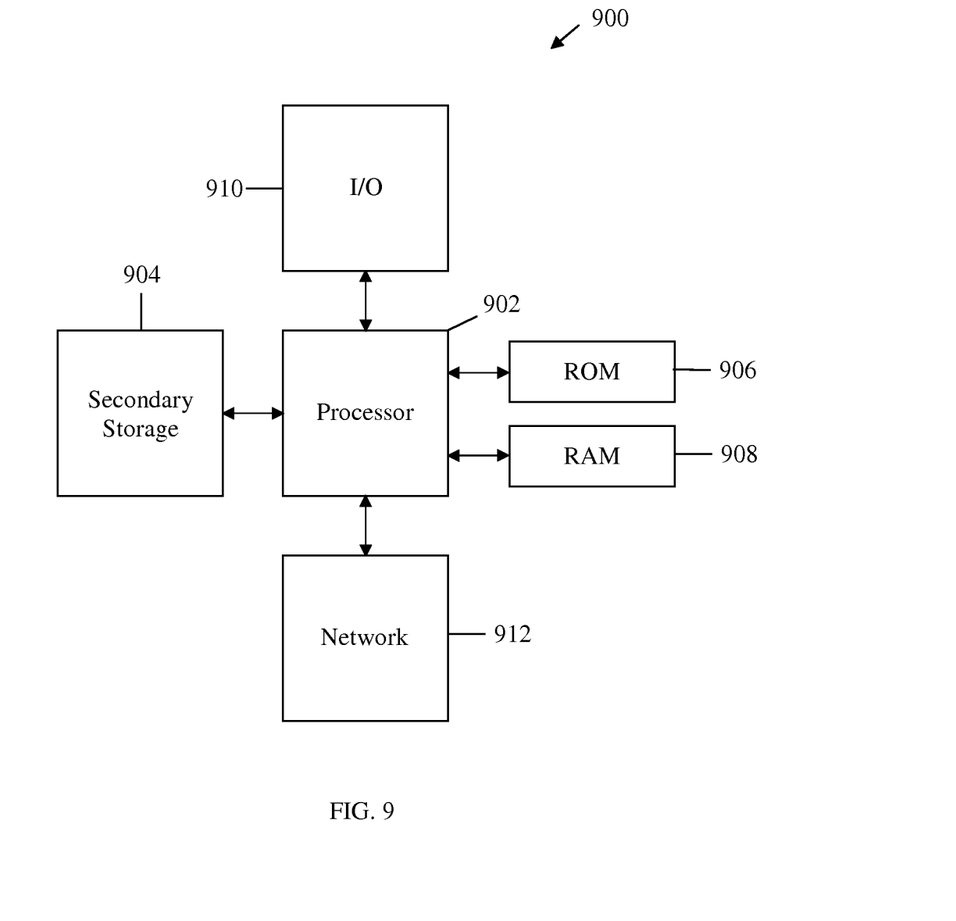
FIG. 9 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 9 illustrates a typical, general-purpose network component 900 suitable for implementing one or more embodiments of the components disclosed herein. The network component 900 includes a processor 902 (which may be referred to as a central processor unit or CPU) that is in communication with memory devices including secondary storage 904, read only memory (ROM) 906, random access memory (RAM) 908, input/output (I/O) devices 910, and network connectivity devices 912. The processor 902 may be implemented as one or more CPU chips, or may be part of one or more application specific integrated circuits (ASICs).

The secondary storage 904 is typically comprised of one or more disk drives or tape drives and is used for non-volatile storage of data and as an over-flow data storage device if RAM 908 is not large enough to hold all working data. Secondary storage 904 may be used to store programs that are loaded into RAM 908 when such programs are selected for execution. The ROM 906 is used to store instructions and perhaps data that are read during program execution. ROM 906 is a non-volatile memory device that typically has a small memory capacity relative to the larger memory capacity of secondary storage 904. The RAM 908 is used to store volatile data and perhaps to store instructions. Access to both ROM 906 and RAM 908 is typically faster than to secondary storage 904.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network comprising:
    a provider backbone bridged network (PBBN) that comprises a plurality of backbone core bridges (BCBs);
    a plurality of backbone edge bridges (BEBs) in the PBBN that are coupled to the BCBs;
    a plurality of customer bridges (CBs) coupled to the BEBs via a plurality of customer-virtual local area networks (C-VLANs),
    wherein at least some of the BCBs are configured to support customer-tagged (C-tagged) traffic,
    wherein each of the CBs are configured to support C-tagged traffic,
    wherein one of the BEBs is configured to:
        map one of the C-VLANs identified by a first Customer-tag (C-tag) within a C-tagged frame to a backbone-virtual local area network (B-VLAN) identified by a second C-tag within a second C-tagged frame; and
        add an encapsulated address type (EAT) EtherType field to the second C-tagged frame that excludes a Backbone Service Instance-tag (I-tag) for the second C-tagged frame, wherein the C-tagged frame is forwarded between one of the CBs and one of the BEBs using one of the C-VLANs, and wherein the second C-tagged frame is forwarded between one of the BCBs and one of the BEBs using the B-VLAN.

2. The network of claim 1, wherein the BEBs are configured to use a C-tag Ethertype, a Service-tag (S-tag) Ethertype, or both to identify the B-VLAN.

3. The network of claim 1, wherein the CBs are coupled to the BCBs in the PBBN via the C-VLANs, and wherein the BEBs are configured to forward C-tagged traffic between the CBs and the BCBs.

4. The network of claim 3, wherein the C-VLANs are extended across the PBBN, and wherein the C-tagged traffic is forwarded along the C-VLANs without mapping the C-tagged traffic to a plurality of backbone-virtual local area networks (B-VLANs).

5. A backbone edge bridge (BEB) configured to forward customer-tagged (C-tagged) data traffic within a Provider Backbone Bridging Network (PBBN), comprising:

a processor coupled to a plurality of ports, wherein the processor is configured to:

receive a C-tagged frame that comprises a customer-tag (C-tag) from a customer bridge (CB) via an input port;

map a customer-virtual local area network (C-VLAN) to a backbone-virtual local area network (B-VLAN);

add an encapsulated address type (EAT) EtherType field to a second C-tagged frame that excludes a Backbone Service Instance-tag (I-tag) for the second C-tagged frame, and forward the second C-tagged frame that comprises a second C-tag to a backbone core bridge (BCB) via an output port, wherein the C-tagged frame is transported over the C-VLAN, wherein the second C-tagged frame is transported over the B-VLAN, wherein the C-tag identifies the C-VLAN, wherein the second C-tag identifies the B-VLAN, and wherein the CB and the BCB are both configured to support C-tagged traffic.

6. The BEB of claim 5, wherein the C-VLAN and the B-VLAN are the same virtual local area network (VLAN), and wherein the data within the C-tagged frame and the second C-tagged frame are the same.

7. The BEB of claim 6, wherein the first C-tagged frame and the second C-tagged frame are bridge protocol data units (BDPUs).

8. The BEB of claim 6, wherein the first C-tagged frame and the second C-tagged frame are multiple registration protocol (MRP) protocol data units (PDU).

9. The BEB of claim 5, wherein the BEB is further configured to map a service-virtual local area network (S-VLAN) to a B-VLAN for S-tagged traffic.

10. The BEB of claim 5, wherein the CB is identified using a media access control (MAC) address, and wherein the CB's media access control (MAC) address is not known to the BCB.

11. The BCB of claim 5, wherein the BCB is identified using a MAC address, and wherein the MAC address is unknown to the CB.

12. A method for deploying a Provider Backbone Bridging Network (PBBN) within a data center network using a backbone edge bridge (BEB), wherein the method comprises:

receiving a customer-tagged (C-tagged) frame that comprises a customer-tag (C-tag) from a customer bridge (CB);

mapping a customer-virtual local area network (C-VLAN) to a backbone-virtual local area network (B-VLAN);

add an encapsulated address type (EAT) EtherType field to a second C-tagged frame that excludes a Backbone Service Instance-tag (I-tag) for the second C-tagged frame; and transmitting the second C-tagged frame that comprises a second C-tag to a backbone core bridge (BCB) within the B-VLAN, wherein the C-tag identifies the C-VLAN, wherein the second C-tag identifies the B-VLAN, and wherein the CB and the BCB are both configured to support C-tagged traffic.

13. The method of claim 12, wherein the data carried within the C-tagged frame and the second C-tagged frame are the same.

14. The method of claim 13, wherein the B-VLAN and the C-VLAN are the same virtual local area network (VLAN), and wherein the second C-tagged frame is a multi-cast frame that further comprises a group Customer-Destination Media Access Control (C-DMAC) that indicates a Customer-Destination Address (C-DAs) across the B-VLAN.

15. The method of claim 14 further comprising transmitting the second C-tagged frame to a second BCB within the B-VLAN.

* * * * *

UNITED STATES PATENT AND TRADEMARK OFFICE
CERTIFICATE OF CORRECTION

| | | |
|---|---|---|
| PATENT NO. | : 8,549,178 B2 | Page 1 of 1 |
| APPLICATION NO. | : 12/786651 | |
| DATED | : October 1, 2013 | |
| INVENTOR(S) | : Robert Sultan and T. Benjamin Mack-Crane | |

It is certified that error appears in the above-identified patent and that said Letters Patent is hereby corrected as shown below:

Title Page

Item 56 "Other Publications" insert

--Sultan, et al., "PBBN in the Data Center", IEEE 802.1, May 2009 Interim Meeting, Pittsburgh, Pennsylvania, 17 pages.--

Signed and Sealed this
Twenty-sixth Day of November, 2013

Margaret A. Focarino
*Commissioner for Patents of the United States Patent and Trademark Office*